Jan. 20, 1942. J. A. PARKS, JR 2,270,639
CUTTING APPARATUS
Filed Jan. 2, 1941

INVENTOR
JOSEPH A. PARKS, JR
BY
Francis H. Seke
ATTORNEY

Patented Jan. 20, 1942

2,270,639

UNITED STATES PATENT OFFICE 2,270,639

CUTTING APPARATUS

Joseph A. Parks, Jr., Radburn, N. J., assignor to Champlain Corporation, Garfield, N. J., a corporation of New York Application January 2, 1941, Serial No. 372,777

6 Claims. (Cl. 164—28)

This invention relates to rotary cutting, scoring and perforating apparatus and particularly to an apparatus of this character which uses rigidly mounted steel rule blades. The invention aims to provide an improved adjustable mounting for the cutting cylinder blades.

Because of their low cost and the ease with which they may be replaced, steel rule cutting blades adapt themselves well to use in rotary cutting apparatus. When the blades are to be rigidly, rather than resiliently, mounted in the cutting cylinder, they may either be secured in place directly in channels provided in the cutting cylinder, or they may first be mounted in suitable holding devices which are then attached directly to the cutting cylinder. With either of these constructions, it is always desirable to have the blades adjustable in some manner so that proper initial settings may be made and suitable adjustments made in order to compensate for wear in the blades themselves. For this purpose, it has been suggested that the base or lower edge of each blade abut against some adjustable or moveable member or members, such as a plurality of suitable screws, which may be moved radially of the cylinder to effect a corresponding adjusting movement of the blade or at least the portion thereof adjacent the moveable member. However, unless an aperture extending radially through the cylinder is provided beneath each adjusting screw, which is a highly impractical construction because it greatly reduces the cutting cylinder strength, the adjusting devices themselves are inaccessible; and in all known commercial constructions of this character, it has been necessary to remove either the blade holder or the member which secures the blade in place on the cylinder in order to gain access to the adjusting devices.

I have devised an improved construction for adjustably mounting steel rule blades of any desired lineal configuration in a cutting cylinder, which construction is accessible for adjustments without the removal of any parts thereof.

In accordance with my invention, each cutting blade is mounted in a recess or groove provided in the cylinder and is held in proper position above an adjusting member by means of a suitable wedge or a plurality of wedges. The arrangement of the parts is such that merely by loosening the screws holding the wedges in proper fixed position, each adjusting member may be moved so as to effect a radial adjusting movement in the associated blade without in any way disturbing the general arrangement of the parts on the cutting cylinder. With this construction all adjustments can be easily and quickly made while the cutting cylinder itself is operatively mounted in a cutting apparatus.

The above and other features and objects of the present invention will become apparent upon consideration of the following detailed description of one embodiment thereof, and the accompanying drawing, in which.

Figure 2:
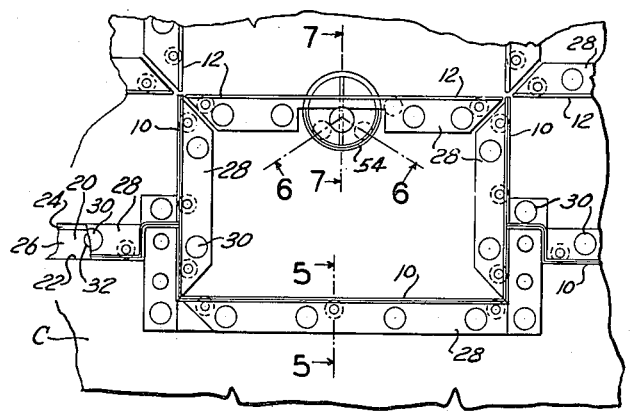
Fig. 2 is an enlarged flattened-out surface view of a portion of the cylinder surface shown in Fig. 1.
Figure 3:
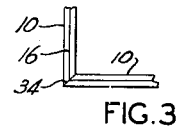
Fig. 3 is an enlarged fragmentary detailed view of a portion of the apparatus shown in Fig. 2 illustrating the blade construction where the ends of two cutting blades abut one another at right angles.
Figure 4:
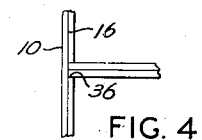
Figure 5:
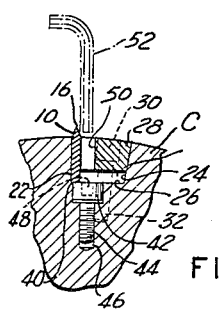
Figures 6, 7:
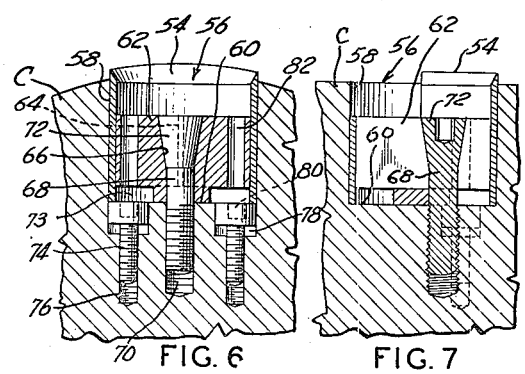

Fig. 4 is a fragmentary detailed view, similar to Fig. 3, illustrating the blade construction when the end of one cutting blade abuts the side of another blade; and Figs. 5, 6 and 7 are vertical sectional views, taken substantially along the lines 5—5, 6—6 and 7—7 of Fig. 2, and illustrating in detail the improved adjustable mounting construction for both straight and curved cutting blades.

Figure 1:
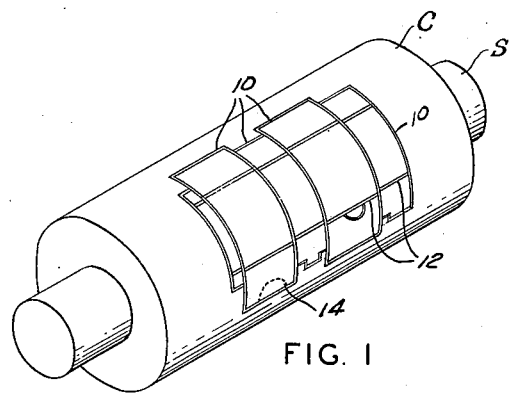
Fig. 1 is a perspective view, somewhat diagrammatic, of a cutting cylinder having a plurality of cutting, scoring and perforating blades mounted therein in accordance with my invention.

Referring now to the drawing, and particularly Fig. 1, it will be observed that a cutting cylinder C is provided with a suitable shaft S so that said cylinder may be mounted in cooperative relation with a suitable impression cylinder for use in a rotary cutting apparatus. Such apparatus is generally used in the production of blanks for cartons, boxes, display boards, and the like from a continuously moving web of paper stock. In order to cut the moving web into blanks of the desired configuration, suitable cutting blades 10, scoring blades 12 and perforating blades 14 are suitably arranged and secured in the cutting cylinder surface. Depending upon the size of the finished blank, the positioning of blades 10, 12 and 14 and the diameter of the cylinder C may be such that one or a plurality of blanks may be cut from the web during each revolution of the cylinder C. The blades 10, 12 and 14 shown in the present instance are all steel rule blades, the cutting blades 10 having suitable cutting edges 16, the scoring or creasing blades 12 having flat or blunt edges and the perforating blades 14 having suitable toothed upper edges for producing the desired perforations in the web. It is to be understood, however, that any desired type and arrangement of blades may be used in the practice of my present invention.

When the blades 10, 12 and 14 are straight, they may be mounted and held in place in suitable grooves or recesses 20 provided in the surface of the cylinder C, as shown in Fig. 2, for example. Each groove 20 has a radial or vertical side wall 22, a sloping or angularly disposed wall 24 and a bottom wall 26. The vertical or radial walls 22 are all accurately machined so that when one of the blades 10, 12 or 14 is held there against, the cut, crease or perforated line produced in the web will be in the desired position. Each blade may be effectively held in proper position against the wall 22 of the associated recess 20 by means of a suitable wedge member 28 which conforms substantially to the shape of the particular recess 20 in which it is mounted and is held in place by means of screws 30 which extend thru the wedge member 28 and into threaded openings 32 extending into the cylinder C from the bottom wall 26 of the recess 20.

Where it is desired to have sharp right angle cuts in the finished blank at a corner thereof, for example, the blade 10 may be provided with ends 34 cut at 45° angles so that adjoining blades may abut together as illustrated in Fig. 3; or one of the blades may be provided with a suitable channel or groove 36 in one face thereof so that the abutting blade may fit into said groove as illustrated in Fig. 4. With blades abutting one another in this manner, it will be understood that the associated wedge member 28 may likewise be provided with angular end portions so that proper blade support may be obtained throughout the entire length thereof.

In most cutting cylinder constructions of the general character thus far described, the cutting blade 10 is arranged so that its base or lower edge 40 (Fig. 5) rests upon the bottom wall 26 of the associated recess 20 in which the blade is mounted, the distance between the base 40 and the cutting edge 16 of the blade and the depth of the particular groove 20 being such that the cutting edge 16 is properly spaced radially of the cylinder so that effective cutting may take place. With such a construction, it is necessary that the depth of the groove 20 be accurately machined and the height of the blade 10 likewise be accurately machined so that a proper positioning of the cutting edge is assured; then when any blade wears, it must be replaced or a suitable shim placed beneath the lower edge 40 thereof to compensate for the wear. Where precision cutting is being done, it frequently is desirable to position the cutting edge 16 of each cutting blade with an accuracy of from 0.0001 to 0.001 inch, and, moreover, it is often desirable to make minor adjustments of the blade before the apparatus is put into commercial operation. In accordance with my invention, the cutting blade 10, and all other blades used on the cutting cylinder are adjustably mounted in a manner that permits adjustments to be made without removing the blade or the wedge members which hold the blade in place in the cylinder. One practical embodiment of the basic features of my improved adjusting mechanism for the cutting, scoring or perforating blades will now be described.

As shown in Fig. 5, where the adjustable mounting of a straight transverse cutting blade 10 is illustrated, the lower edge 40 of the blade 10, instead of resting upon the bottom wall 26 of the groove 20, rests upon the enlarged upper end or head 42 of a plurality of moveable adjusting members 44. In the form of the invention shown, the adjustnig members 44 comprise headed screws which are mounted in threaded openings 46 provided in the cylinder C and extending radially inwardly from the bottom wall 26 of the groove 20. Any desired number of screws 44 may be provided, but sufficient should be used to afford proper support for the blade throughout the entire length thereof. Depending upon the length of the blade, it is desirable to have one supporting and adjusting screw adjacent to each end of the blade and one or more spaced throughout its length. It will be apparent that by moving the supporting and adjusting screws 44 inwardly or outwardly in the threaded openings 46, the position of the associated blade 10 may be adjusted.

To permit adjustment of the blade by movement of the adjusting and supporting screws 44 without removing the wedge members 28 or the blade 10 from the particular recess or groove 20 in which said blade is mounted, the center line of each adjusting screw is positioned to the side of the blade 10 and the head or top surface 42 is sufficiently large to provide ample support for the bottom edge of the blade 10. The size and position of the screws 44 is such that a suitable keyway 48 may be provided in the central portion of the upper surface 42 thereof and be free of the bottom edge 40 of the blade 10. An aperture 50 is provided in the wedge member 28 above each of the supporting and adjusting screws 44 and is positioned so that a suitable key 52 may be inserted therethrough and into the key-way 48 for turning the adjusting screws 44 so as to permit the blade 10 to be adjusted either upwardly or downwardly, as may be desired.

From the foregoing, it will be understood that by loosening the screws 30 for the wedge members 28 a small amount so that the blade 10 is still frictionally engaged but nevertheless may be moved for adjustment, the adjusting screws 44 may be rotated by inserting the keys 52 through the apertures 50 and into the key-way 48 provided in said screws. In this manner, the radial position of the blade may be adjusted with any desired degree of accuracy; and when an adjustment has been made, said blades may be held in proper adjusted position by tightening the screws 30 in the wedge members.

In Figs. 6 and 7, I have shown an adjustable mounting embodying the principles of my invention and particularly designed for use in conjunction with a curved cutting blade, such as the circular cutting blade 54 shown in Fig. 2. The principal difference in this form of construction over that described above consists in the lack of an angularly disposed face in the recess in which the blade is supported so that a wedge action may be obtained. That is, the circular blade 54 is mounted in a correspondingly shaped recess 56 having a cylindrical side wall 58 against which the blade 54 is supported and a bottom wall 60 into which the screws for supporting a wedge member 62 may be threaded. The wedge member 62 comprises a cylindrical block provided with a saw cut groove 64 on the diameter thereof so that the wedge member may be spread apart and exert a wedging action against the inside face of the blade 54. To accomplish this spreading of the block 62, the block is provided along the groove 64 with a suitable aperture 66 through which a supporting screw 68 may extend into threaded engagement with a threaded opening 70 provided in the bottom wall 60 of the recess in which the blade is mounted. The aperture 66 is, at least in the upper portion thereof, frustro-conical in shape and coacts with a somewhat larger but correspondingly shaped head 72 provided on the screw 68. Thus, as the screw is moved downwardly through the aperture 66, the coaction between the frustro-conical head of the screw and the aperture 66 will cause the block 62 to be spread apart along the groove 64 and thus exert a wedging action on the blade.

As in the construction shown in Fig. 5, the lower edge or base of the blade 54 is supported on the upper surfaces 73 of a plurality of headed adjusting screws 74 mounted in threaded openings 76 provided in the bottom wall 60 of the recess 54. Said openings 76 may be suitably enlarged, as at 78, at their upper ends, so that the enlarged heads of the adjusting screws 74 may pass below the level of the bottom wall 60 in their adjusting movements. Each supporting and adjusting screw 74 is provided in the upper surface 73 thereof with a suitable key-way 80 which is disposed in alignment with an aperture 82 provided in the wedge member 62. It will be apparent that by loosening the wedge screw 68 to release the wedging action of the wedge member 62, keys, similar to the key 52, may be inserted through the apertures 82 into the key-ways 80 of the adjusting screws 74, so that said screws may be moved inwardly or outwardly to effect the desired adjustment of the blade 54.

While I have described embodiments of my invention in which screws are used as the adjusting members, it will be understood that such members may take other forms, such as slidable supporting wedges, if desired. Moreover, various other changes may be made in the constructions described herein, and certain features thereof may be employed without others, without departing from my invention or sacrificing any of its advantages.

What I claim is:

1. Rotary cutting apparatus, comprising a cylindrical member having a recess in the surface thereof; a blade arranged in said recess and having an upper operating edge which projects beyond the surface of said cylindrical member; a movable adjusting member disposed in said recess beneath the lower edge of said blade; and means for holding said blade in operative position in said recess, said holding means having an opening therein through which a tool may be inserted for actuating said adjusting member.

2. Rotary cutting apparatus, comprising a cylindrical member having a recess in the surface thereof; an adjusting screw operatively disposed in said recess; a blade arranged in said recess and having its lower edge in contact with said adjusting screw and its upper edge projecting beyond the surface of said cylindrical member; and wedge means for holding said blade in operative position in said recess, said wedge means having an opening therein through which a tool may be inserted for actuating said adjusting screw.

3. Rotary cutting apparatus, comprising a cylindrical member having a recess in the surface thereof with one wall corresponding to the shape of a cutting blade to be mounted therein; a blade arranged in said recess with one side thereof contacting said wall and having an upper operating edge which projects beyond the surface of said cylindrical member; a movable adjusting member disposed in said recess beneath the lower edge of said blade; and wedge means for holding said blade in operative position in said recess, said wedge means having an opening therein through which a tool may be inserted for actuating said adjusting member.

4. Rotary cutting apparatus, comprising a cylindrical member having a recess in the surface thereof with a partially cylindrical side wall against which a correspondingly shaped cutting blade is adapted to be mounted; a partially cylindrical cutting blade arranged in said recess with one side thereof in contact with said partially cylindrical wall and having an upper operating edge which projects beyond the surface of said cylindrical member; a movable adjusting member disposed in said recess beneath the lower edge of said blade; and means for holding said blade in operative position in said recess, said holding means having an opening therein through which a tool may be inserted for actuating said adjusting member.

5. Rotary cutting apparatus, comprising a cylindrical member having a recess in the surface thereof with a partially cylindrical side wall against which a correspondingly shaped cutting blade is adapted to be mounted; a partially cylindrical cutting blade arranged in said recess with one side thereof in contact with said partially cylindrical wall and having an upper operating edge which projects beyond the surface of said cylindrical member; a movable adjusting member disposed in said recess beneath the lower edge of said blade; an expandible block disposed in said recess for holding said blade in operative position and having an opening therein through which a tool may be inserted for actuating said adjusting member; and means for expanding said block.

6. Rotary cutting apparatus comprising a cylindrical member having a recess in the surface thereof with a radially disposed wall against which a cutting blade is adapted to be positioned; an adjusting screw operatively disposed in said recess; a blade arranged in said recess with one side thereof in operative contact with said radially disposed wall, and having its lower edge in contact with said adjusting screw and its upper edge projecting beyond the surface of said cylindrical member, the center line of said adjusting screw being positioned to the side of said blade; and wedge means for holding said blade in operative position in said recess, said wedge means having an opening therein disposed above the center of said adjusting screw and through which a tool may be inserted for actuating said adjusting screw.

JOSEPH A. PARKS, Jr.